United States Patent
Bradford

(10) Patent No.: US 10,054,022 B2
(45) Date of Patent: Aug. 21, 2018

(54) EXHAUST TREATMENT SYSTEM HAVING MEMBRANE MODULE FOR WATER REMOVAL

(71) Applicant: Tenneco Automotive Operating Company Inc., Lake Forest, IL (US)

(72) Inventor: Michael C. Bradford, Chelsea, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 149 days.

(21) Appl. No.: 15/050,521

(22) Filed: Feb. 23, 2016

(65) Prior Publication Data
US 2017/0241317 A1    Aug. 24, 2017

(51) Int. Cl.
*F01N 3/00* (2006.01)
*F01N 3/20* (2006.01)
(Continued)

(52) U.S. Cl.
CPC .......... *F01N 3/2073* (2013.01); *F01N 3/005* (2013.01); *F01N 3/02* (2013.01); *F01N 3/031* (2013.01);
(Continued)

(58) Field of Classification Search
CPC .......... F01N 3/005; F25B 17/00; F25D 21/14; F28D 2021/0038
See application file for complete search history.

(56) References Cited

U.S. PATENT DOCUMENTS

| 7,214,719 B2 * | 5/2007 | Jansen ............... B01D 67/0051 |
| | | 210/640 |
| 8,182,584 B1 | 5/2012 | Kirts |
| | (Continued) | |

FOREIGN PATENT DOCUMENTS

DE    10 2012 211 862    7/2012
EP       2 708 275       3/2014
(Continued)

OTHER PUBLICATIONS

Khajavi; Application of Hydroxy Sodalite Films as Novel Water Selective Membranes; Journal of Membrane Science 326 (2009) 153-160.
(Continued)

*Primary Examiner* — Mark Laurenzi
*Assistant Examiner* — Anthony Ayala Delgado
(74) *Attorney, Agent, or Firm* — Harness, Dickey & Pierce, P.L.C.

(57) ABSTRACT

An exhaust after-treatment system for treating an exhaust produced by an engine. The exhaust after-treatment system includes an exhaust passage, at least one catalytic exhaust after-treatment component in communication with the exhaust passage for treating the exhaust, and a water-removal device in communication with the exhaust passage that receives a portion of the exhaust therein at a location positioned upstream from the catalytic exhaust after-treatment component. The water-removal device is defined by a housing that includes a water-removal membrane that separates water from the portion of the exhaust to provide a permeate that is enriched with water, and to produce a retentate that is water depleted that facilitates the treating of the exhaust by the catalytic exhaust after-treatment component.

31 Claims, 3 Drawing Sheets

(51) Int. Cl.

| | | |
|---|---|---|
| *F01N 3/035* | (2006.01) | |
| *F01N 3/22* | (2006.01) | |
| *F01N 3/30* | (2006.01) | |
| *F01N 13/08* | (2010.01) | |
| *F02M 69/18* | (2006.01) | |
| *F02M 69/26* | (2006.01) | |
| *F02M 69/32* | (2006.01) | |
| *F02M 69/38* | (2006.01) | |
| *F01N 3/02* | (2006.01) | |
| *F01N 3/031* | (2006.01) | |
| *F02M 35/08* | (2006.01) | |
| *F01P 3/22* | (2006.01) | |
| *F02D 41/00* | (2006.01) | |

(52) U.S. Cl.
CPC ........... *F01N 3/035* (2013.01); *F01N 3/2006* (2013.01); *F01N 3/2053* (2013.01); *F01N 3/22* (2013.01); *F01N 3/30* (2013.01); *F01N 13/087* (2013.01); *F02M 35/08* (2013.01); *F02M 35/082* (2013.01); *F02M 69/18* (2013.01); *F02M 69/26* (2013.01); *F02M 69/32* (2013.01); *F02M 69/386* (2013.01); *F01N 2250/02* (2013.01); *F01N 2350/06* (2013.01); *F01N 2410/00* (2013.01); *F01N 2550/06* (2013.01); *F01N 2570/14* (2013.01); *F01N 2610/02* (2013.01); *F01N 2610/03* (2013.01); *F01P 2003/2292* (2013.01); *F02D 41/0065* (2013.01); *Y02T 10/20* (2013.01); *Y02T 10/22* (2013.01)

(56) References Cited

U.S. PATENT DOCUMENTS

| | | | |
|---|---|---|---|
| 8,511,072 B2 | 8/2013 | Judkins et al. | |
| 8,887,495 B2* | 11/2014 | Ren | B01D 46/0024 60/274 |
| 9,259,686 B2 | 2/2016 | Ogiwara | |
| 9,859,576 B2* | 1/2018 | Koo | H01M 8/04149 |
| 2005/0184009 A1 | 8/2005 | Jansen et al. | |
| 2007/0175333 A1 | 8/2007 | Shoemaker | |
| 2011/0168128 A1* | 7/2011 | Bradley | F01N 3/005 123/294 |
| 2011/0179778 A1* | 7/2011 | Durrett | B01D 53/22 60/299 |
| 2013/0276632 A1 | 10/2013 | Judkins et al. | |
| 2015/0107453 A1 | 4/2015 | Usuda | |
| 2016/0101995 A1 | 4/2016 | Staubach | |

FOREIGN PATENT DOCUMENTS

| | | |
|---|---|---|
| JP | 2005-161115 | 6/2005 |
| JP | 2006233938 A * | 9/2006 |
| WO | 2016/034401 | 3/2016 |
| WO | 2017/078146 | 5/2017 |

OTHER PUBLICATIONS

Khajavi: Application of a sodalite membrane reactor in esterification-Coupling reaction and separation; Catalysis Today 156 (2010) 132-139.

Krishna; Diffusion in porous crystalline materials; Chem. Soc. Rev., 2012, 41, 3099-3118.

Rohde: Fischer-Tropsch synthesis with in situ H2O removal—Directions of membrane development; Microporous and Mesoporous Materials 115 (2008) 123-136.

Nabavi: Hydrothermal synthesis of hydroxy sodalite zeolite membrane: Separation of H2/CH4; Ceramics International 40 (2014) 5889-5896.

Monai: Methane Catalytic Combustion over Hierarchical Pd@CeO2/Si—Al2O3 : Effect of the Presence of Water; ChemCatChem; 2014.

Chen: Methane Oxidation on Pd@ZrO$_2$/Si—Al$_2$O$_3$ Is Enhanced by Surface Reduction of ZrO$_2$; ACS Catal. 2014, 4, 3902-3909.

Khajavi: Performance of hydroxy sodalite membranes as absolute water selective materials under acidic and basic conditions; Journal of Membrane Science 356 (2010) 1-6.

Daramola: Potential Applications of Zeolite Membranes in Reaction Coupling Separation Processes; *Materials* 2012, 5, 2101-2136;.

Gascon: Practical Approach to Zeolitic Membranes and Coatings: State of the Art, Opportunities, Barriers, and Future Perspectives; Chem. Mater. 2012, 24, 2829-2844.

Khajavi: Preparation and performance of H-SOD membranes: a new synthesis procedure and absolute water separation; 2007.

Kosinov: Recent developments in zeolite membranes for gas separation; Journal of Membrane Science 499 (2016) 65-79.

Wang: Supported SOD membrane with steam selectivity by a two-step repeated hydrothermal synthesis; Microporous and Mesoporous Materials 192 (2014) 8-13.

Günther: Synthesis and characterization of a sulfur containing hydroxy sodalite without sulfur radicals; Microporous and Mesoporous Materials 214 (2015) 1-7.

Kalantari: Synthesis of nanostructure hydroxy sodalite composite membranes via hydrothermal method: support surface modification and synthesis method effects; Asia-Pac. J. Chem. Eng. 2015; 10: 45-55.

Khajavi: Synthesis of thin defect-free hydroxy sodalite membranes: New candidate for activated water permeation; Journal of Membrane Science 299 (2007) 63-72.

Khajavi: Thermostability of hydroxy sodalite in view of membrane applications; Microporous and Mesoporous Materials 132 (2010) 510-517.

Moses-Debusk: Water Recovery from Gasoline Exhaust; Oak Ridge National Laboratory; date unknown.

Günther: Zeolite Membranes for Hydrogen and Water Separation under Harsh Conditions; The Italian Association of Chemical Engineering, vol. 32, 2013.

Dragomirova: Zeolite Membranes in Catalysis-From Separate Units to Particle Coatings; *Catalysts* 2015, 5, 2161-2222.

Rangnekar: Zeolite membranes—a review and comparison with MOFs; Chem. Soc. Rev., 2015, 44, 7128.

* cited by examiner

EXHAUST TREATMENT SYSTEM HAVING MEMBRANE MODULE FOR WATER REMOVAL

FIELD

The present disclosure relates to an exhaust treatment system having a membrane module for water removal.

BACKGROUND

This section provides background information related to the present disclosure which is not necessarily prior art.

Exhaust after-treatment systems generally comprise a catalyst component, such as a catalyst-coated exhaust treatment component, to treat the engine exhaust to remove harmful combustion by-products such as NOx, CO, and the like. During operation of the catalyst component, however, the catalyst component performance can be inhibited by the presence of water in the gas phase, as evidenced by an increase in light-off temperature with increasing water content in the gaseous exhaust. Although water content could be reduced through exhaust gas cooling and condensation, this process would require energy consumption for both condensation and gas reheating, which would be required for efficacy of the downstream catalyst component. Therefore, reduction of the water content in the gas exhaust without cooling the gas stream should significantly improve the light-off characteristics (and low-temperature performance characteristics) of several catalysts (in particular those for low-temperature methane oxidation, selective catalytic reduction of NOx (SCR), and lean NOx trapping and reduction (LNT).

SUMMARY

This section provides a general summary of the disclosure, and is not a comprehensive disclosure of its full scope or all of its features.

In one embodiment, the present disclosure provides an exhaust after-treatment system for treating an exhaust produced by an engine. The exhaust after-treatment system includes an exhaust passage, at least one catalytic exhaust after-treatment component in communication with the exhaust passage for treating the exhaust, and a membrane vessel in communication with the exhaust passage that receives a portion of the exhaust therein at a location positioned upstream from the catalytic exhaust after-treatment component. The membrane vessel includes a molecular membrane that separates at least one constituent from the portion of the exhaust, and the membrane vessel provides a permeate gas that is enriched with the constituent removed from the portion of the exhaust, and produces a retentate gas that is depleted of the constituent that facilitates the treating of the exhaust by the catalytic exhaust after-treatment component.

In another embodiment, the present disclosure provides an exhaust after-treatment system for treating an exhaust produced by an engine, where the exhaust after-treatment system includes an exhaust passage, at least one catalytic exhaust after-treatment component in communication with the exhaust passage for treating the exhaust, and a water-removal device in communication with the exhaust passage that receives a portion of the exhaust therein at a location positioned upstream from the catalytic exhaust after-treatment component. The water-removal device is defined by a housing that includes a water-removal membrane that separates water from the portion of the exhaust to provide a permeate that is enriched with water, and to produce a retentate that is water depleted that facilitates the treating of the exhaust by the catalytic exhaust after-treatment component. Further, at least one recirculation line may interconnect the water-removal device and the engine that recirculates at least a portion of the permeate back to the engine.

In each of the above-noted embodiments, the catalytic exhaust after-treatment component may include a diesel particulate filter (DPF), a diesel oxidation catalyst (DOC) component, a selective catalytic reduction (SCR) component, a lean $NO_x$ trap (LNT), an ammonia slip catalyst (ASC), a three-way catalyst (TWC), a methane oxidation catalyst (MOC), a hydrocarbon-deNOx catalyst (HC-deNOx), a lean NOx catalyst (LNC), or a combination thereof.

In each of the above-noted embodiments, the membrane vessel or water-removal device may be mounted at least partially within the exhaust passage.

Each of the above-noted embodiments may further include a bypass passage in communication with the exhaust passage that receives the portion of the exhaust, with the membrane vessel or water-removal device being positioned within the bypass passage.

In each of the above-noted embodiments, the membrane vessel or water-removal device may include an inlet valve configured to allow entry of the portion of the exhaust into the membrane vessel or water-removal device.

Each of the above-noted embodiments may further include a controller in communication with the inlet valve that is configured to open and close the valve.

Each of the above-noted embodiments may further include a mixing device configured to intermix the exhaust with an exhaust treatment fluid, the mixing device being positioned in the exhaust passage downstream from the membrane vessel or water-removal device and upstream of the catalyst exhaust treatment component.

Each of the above-noted embodiments may further include an injector for dosing an exhaust treatment fluid into the exhaust passage.

In each of the above-noted embodiments, the exhaust treatment fluid may be a hydrocarbon exhaust treatment fluid or an exhaust treatment fluid comprising urea.

In each of the above-noted embodiments, the hydrocarbon exhaust treatment fluid may include at least one of ethanol, an ethanol-gasoline mixture, and an ultra-low sulfur diesel fuel.

In each of the above-noted embodiments, the molecular membrane or water-removal membrane may include a ceramic material.

In each of the above-noted embodiments, the ceramic material may be porous, with each pore having a diameter of 0.3 nm or less.

In each of the above-noted embodiments, the ceramic material may comprise a zeolite.

In each of the above-noted embodiments, the zeolite may include a sodalite structure.

In each of the above-noted embodiments, the permeate gas enriched with the constituent may be recycled to the engine or to the exhaust at a location downstream from the catalytic exhaust after-treatment component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
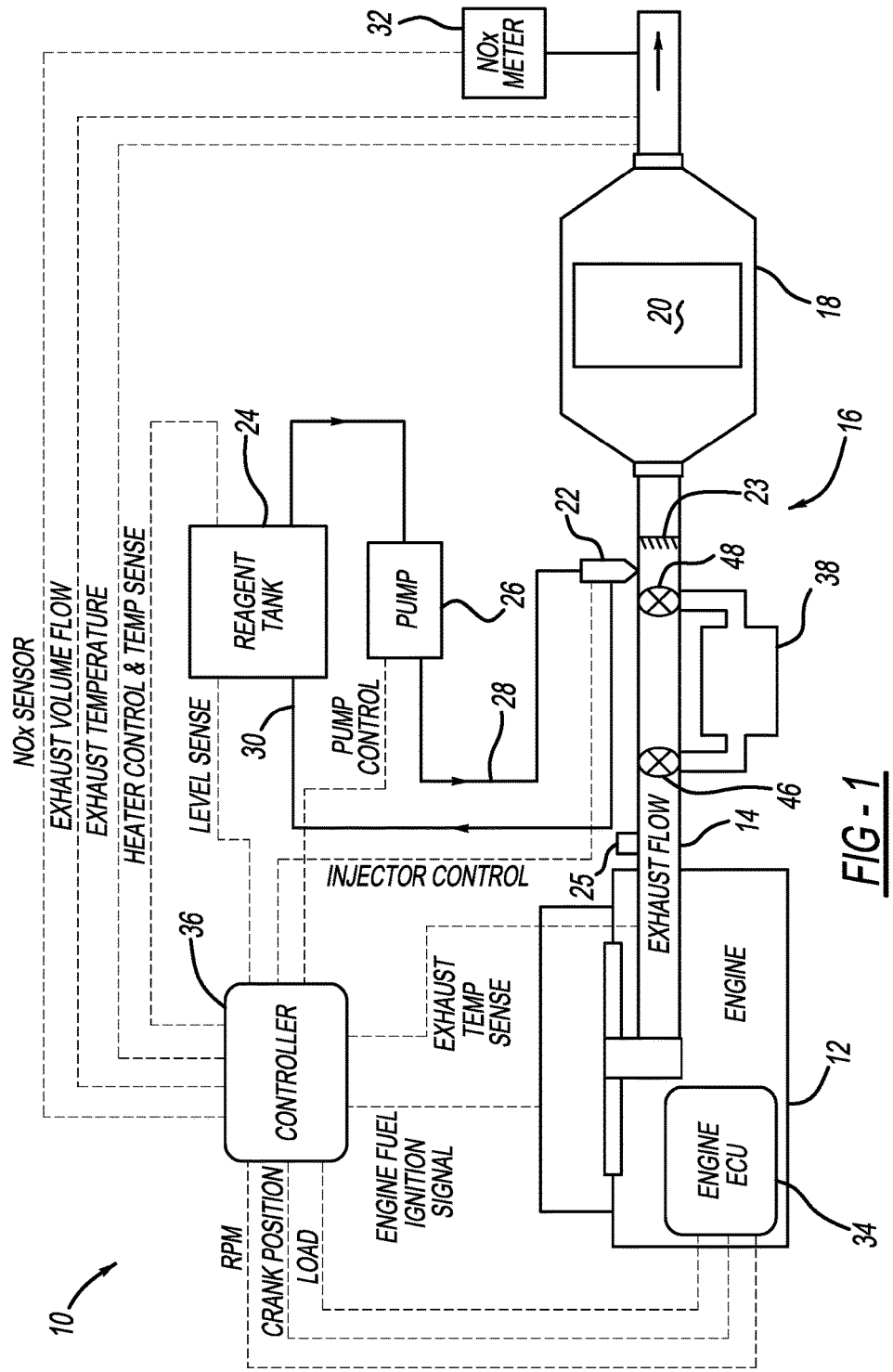
FIG. 1 is a schematic illustration of an exhaust system according to a principle of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 schematically illustrates an exhaust system 10 according to an embodiment of the present disclosure. Exhaust system 10 can include at least an engine 12 in communication with a fuel source (not shown) that, once consumed, will produce exhaust gases that are discharged into an exhaust passage 14 having an exhaust after-treatment system 16. Downstream from engine 12 can be disposed an exhaust treatment component 18 comprising a catalyst, substrate, catalyst-coated substrate or filter 20, which can be any one of a diesel particulate filter (DPF), a diesel oxidation catalyst (DOC) component, a selective catalytic reduction (SCR) component, a lean $NO_x$ trap (LNT), a lean $NO_x$ catalyst (LNC), an ammonia slip catalyst (ASC), a three-way catalyst (TWC), a methane oxidation catalyst, a hydrocarbon-deNOx catalyst (HC-deNOx), or any other type of exhaust treatment device known to one skilled in the art. If a DPF is used, it may be catalyst-coated (e.g., SCR catalyst-coated). In the illustrated embodiment, substrate 20 includes a LNC component. Although only a single exhaust treatment component 18 is illustrated, it should be understood that exhaust after-treatment system 16 may include a plurality of exhaust treatment components 18 each including the same catalyst, substrate, catalyst-coated substrate or filter 20, or where each exhaust treatment component 18 includes a filter 20 having a different catalyst.

Although not required by the present disclosure, exhaust after-treatment system 16 can further include components such as a thermal enhancement device or burner 25 to increase a temperature of the exhaust gases passing through exhaust passage 14. Increasing the temperature of the exhaust gas is favorable to achieve light-off of the catalyst in the exhaust treatment component 18 in cold-weather conditions and upon start-up of engine 12, as well as initiate regeneration of the exhaust treatment component 18 when the exhaust treatment substrate 20 is a DPF.

To assist in reduction of the emissions produced by engine 12, exhaust after-treatment system 16 can include an injector 22 for periodically dosing an exhaust treatment fluid into the exhaust stream. As illustrated in FIG. 1, injector 22 can be located upstream of exhaust treatment component 18, and is operable to inject a suitable reagent. A mixing device 23 that assists in intermingling the reagent and the exhaust stream may be located in exhaust passage 14 between injector 22 and exhaust treatment component 18. In the case of an LNC catalyst component as shown in FIG. 1, injector 22 can inject a hydrocarbon treatment fluid (e.g., ethanol, E85, ultra-low sulfur diesel fuel, or some other hydrocarbon or hydrocarbon mixture (such as an ethanol-gasoline blend)) into the exhaust stream. Injector 22 may receive the exhaust treatment fluid from a reagent tank 24 via a pump 26. The exhaust treatment fluid is fed by pump 26 through inlet line 28 to injector 22, and unused exhaust treatment fluid is routed back to tank 24 by return line 30. If exhaust treatment component 18 includes an SCR substrate, the reagent exhaust treatment fluid held by tank 24 may be an exhaust treatment fluid comprising urea. Flow of the exhaust treatment fluid through inlet line 28, injector 22, and return line 30 also assists in cooling injector 22 so that injector 22 does not overheat.

The amount of exhaust treatment fluid required to effectively treat the exhaust stream may vary with load, engine speed, exhaust gas temperature, exhaust gas flow, engine fuel injection timing, desired $NO_x$ reduction, barometric pressure, relative humidity, EGR rate and engine coolant temperature. A $NO_x$ sensor or meter 32 may be positioned downstream from LNC 20. $NO_x$ sensor 32 is operable to output a signal indicative of the exhaust $NO_x$ content to an engine electronic control unit (ECU) 34. All or some of the engine operating parameters may be supplied from ECU 34 via the engine/vehicle databus to exhaust after-treatment system controller 36. The controller 36 could also be included as part of the ECU 34. Exhaust gas temperature, exhaust gas flow and exhaust back pressure and other vehicle operating parameters such as exhaust relative humidity (not shown) may be measured by respective sensors, either upstream or downstream of the exhaust after-treatment device, as indicated in FIG. 1.

During operation of the catalyst component, however, the catalyst performance of the exhaust treatment component 18 can be inhibited by the presence of water in the gas phase, as evidenced by an increase in light-off temperature of the catalyst as the water content increases in the gaseous exhaust. Although the water content could be reduced through exhaust gas cooling and condensation, this process requires energy consumption for both condensation and gas reheating, which would be required for efficacy of the downstream catalyst component. Thus, the present disclosure provides an exhaust after-treatment system 16 that is effective in reducing the water content in the gaseous exhaust without cooling the gas stream, which significantly improves the light-off characteristics (and low-temperature performance characteristics) of the several catalysts (in particular, those for low-temperature methane oxidation, selective catalytic reduction of NOx, and lean NOx trapping and reduction) that may be used in exhaust after-treatment system 16. In particular, as can be seen in FIG. 1, exhaust after-treatment system includes a membrane vessel or water-removal device 38 that is effective at reducing the content of at least one constituent (e.g., water) in the exhaust stream.

Figure 2:
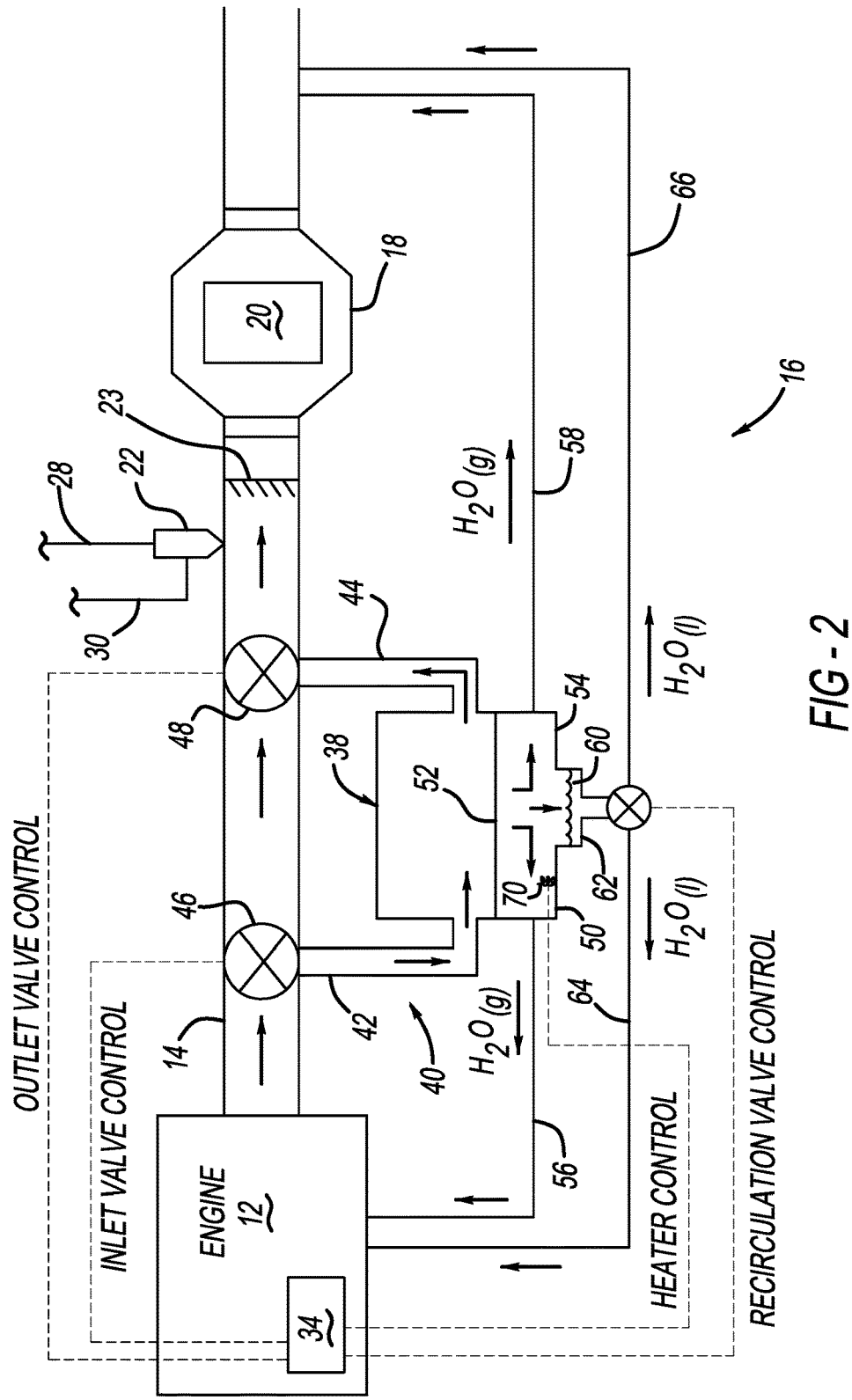
FIG. 2 is a partial schematic illustration of an exhaust system according to a first embodiment of the present disclosure.

The exhaust stream produced by engine 12 and carried by exhaust passage 14 includes constituents such as oxygen ($O_2$), nitrogen ($N_2$), carbon dioxide ($CO_2$), water ($H_2O$) and methane ($CH_4$), amongst others. To remove a constituent such as water from the exhaust stream, as best illustrated in FIG. 2, the membrane vessel or water-removal device 38 communicates with exhaust passage 14. More particularly, in the illustrated embodiment, water-removal device 38 is located in a by-pass line 40 including an inlet 42 and an outlet 44 with the water-removal device 38 located between the inlet 42 and the outlet 44. It may be desirable to locate water-removal device 38 in bypass line 40 because use of water-removal device 38 may only be desired within a certain temperature range during which water removal from the exhaust is most advantageous (i.e., at low temperature conditions). Further, water-removal device 38 may include materials that can be damaged due to exposure to temperatures exceeding a particular threshold (e.g., above 450° C.).

An inlet valve 46 that may be controlled by either ECU 34 or controller 36 can be used to direct the exhaust stream from exhaust passage 14 into inlet 42. Similarly, an outlet valve 48 that may also be controlled by ECU 34 or controller 36 can allow the re-directed exhaust stream after it has passed through water-removal device 38 to reenter exhaust passage 14. It should be understood, however, that the use of outlet valve 48 is optional in the illustrated embodiment. Further, it should be understood that inlet valve 46 may direct an entirety of the exhaust stream into inlet 42, or only a portion of the exhaust stream into inlet 42. Further, it should be understood that ECU 34 or controller 36 can open and close valves 46 and 48 based on a signal indicative of an exhaust temperature.

When it is desired to remove water from the exhaust stream, ECU 34 or controller 36 instructs inlet valve 46 to open, which directs the water-rich permeate exhaust gas to enter water-removal device 38 via inlet 42. Water-removal device 38 includes a tank-like housing 50. A water-removal membrane 52 is positioned within housing 50 that is configured to remove water from the exhaust stream to produce a water-rich permeate gas and a water-deficient retentate gas. The water-deficient retentate gas exits housing 50 through outlet 44 and reenters exhaust passage 14 for subsequent treatment by exhaust treatment component, while the water-rich permeate gas is restricted from passing through the exhaust treatment component 18.

Water-removal membrane 52 may be a flow-through porous monolith having a plurality of pores or parallel channels configured to selectively remove molecules (e.g., water) having a specific molecular size (i.e., less than about 0.30 nm). Water-removal membrane 52 is configured to prevent high backpressures from arising in exhaust after-treatment system 16. That is, water-removal membrane is configured for low pressure drops.

The monolith may be comprised of metal, ceramic, polymer or any suitable combination thereof. Preferably, water-removal membrane 52 comprises inorganic constituents that enable continuous operation and hydrothermal stability at elevated temperatures above 150° C., more preferably between 150° C. and 450° C., and most preferably between 250° C. and 450° C. Some ceramic materials including inorganic zeolite membranes with pore diameters smaller than 0.3 nm are preferable, and zeolites with the sodalite (SOD) structure are most preferable to enable geometric size exclusion or reduced permeability for molecules with a kinetic diameter larger than 0.28 nm. With such a pore or channel size, water-removal membrane 52 is configured to selectively permeate only molecules such as water, helium, and perhaps hydrogen therethrough. In other words, the water-removal membrane 52 acts as a molecular sieve.

The portion of the exhaust stream that permeates through water-removal membrane 52 to form the water-rich permeate gas collects in a reservoir portion 54 of housing 50. Water in gaseous form can be then recirculated from reservoir portion 54 back to engine 12 through a gas recirculation line 56 and/or may be directed back to exhaust passage 14 at a location downstream from exhaust treatment component 18 through a gas outlet line 58. If the water in reservoir portion 54 condenses, the liquid water 60 may collect in a recessed portion 62 of reservoir portion 54. Similar to the gaseous water in reservoir portion 54, the liquid water 60 can be recirculated from recessed portion 62 back to engine 12 through a liquid recirculation line 64 and/or may be directed back to exhaust passage 14 at a location downstream from exhaust treatment component 18 through a liquid outlet line 66. An optional recirculation valve 68 may be used to direct the liquid water 60 to either liquid recirculation line 64 or liquid outlet line 66.

Because liquid water 60 may collect in housing 50 and, in particular, recessed portion 62 of housing 50 during non-use of engine 12, it should be understood that water-removal device 38 may include a heating device 70 therein. Heating device 70 may be thermistor or some other type of heating device, and may be in communication with ECU 34 or controller 36 (not illustrated) such that upon ignition of engine 12 a signal is communicated to heating device 70 in low temperature conditions to warm up water-removal device and thaw any liquid water that may have frozen. In addition, it is possible that water-removal membrane 52 may become fouled over extended periods of use, such that periodic electrical heating in flowing air may be required to remove trapped soot particles, adsorbed sulfur-species, and similar moieties to thereby maintain appropriate flux performance over time. Heating device 70, therefore, may be configured to provide this desired heating. Alternatively, heating device 70 may be omitted in favor of operating burner 25 and allowing the heated exhaust gases to enter water removal device 38.

Figure 3:
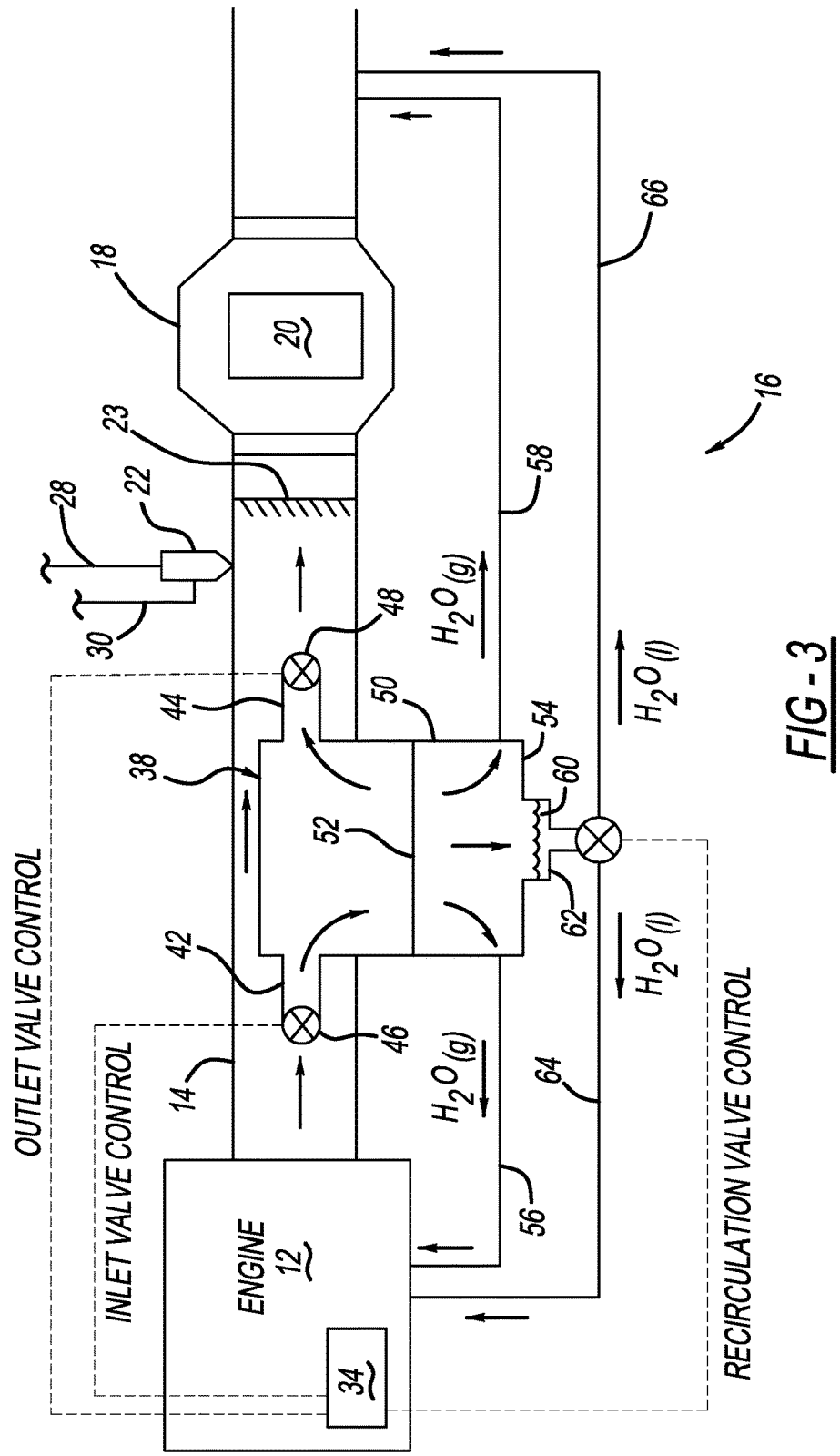
FIG. 3 is a partial schematic illustration of an exhaust system according to a second embodiment of the present disclosure.

Now referring to FIG. 3, a second embodiment of the exhaust after-treatment system 16 is illustrated. The embodiment illustrated in FIG. 3 differs from the embodiment illustrated in FIGS. 1 and 2 in that the water-removal device 38 is at least partially located within exhaust passage 14 rather than exterior to the exhaust passage 14. Although water-removal device 38 is illustrated as being partially located within exhaust passage 14, which facilitates ready maintenance of water-removal device 38 if necessary, it should be understood that water-removal device 38 can be located entirely within exhaust passage 14 if desired. Similar to the embodiment illustrated in FIG. 2, water-removal device 38 includes an inlet 42 and an outlet 44. Inlet 42, however, is located entirely within exhaust passage 14 such that inlet 42 extends co-axially or axially in parallel with exhaust passage 14. Because inlet 42 is located entirely within exhaust passage 14, only a portion of the exhaust stream enters water-removal device 38 while the remaining exhaust gases flow around or over water-removal device 38 without passing therethrough.

The inlet valve 46 that can be controlled by either ECU 34 or controller 36 may be used to direct the exhaust stream from exhaust passage 14 into inlet 42. Similarly, an outlet valve 48 that may also be controlled by ECU 34 or controller 36 can allow the treated exhaust stream (i.e., the water-deficient retentate) after it has passed through water-removal device 38 to reenter exhaust passage 14. In this regard, outlet 44 is also located entirely within exhaust passage 14. It should be understood, however, that the use of outlet valve 48 is optional in the illustrated embodiment.

When it is desired to remove a constituent such as water from the exhaust stream, ECU 34 or controller 36 instructs inlet valve 46 to open, which allows a portion of the exhaust stream to enter water-removal device 38 via inlet 42. Water-removal device 38 is the same as described above relative to the first embodiment in that water-removal device includes a tank-like housing 50 and a water-removal membrane 52 positioned therein that is configured to remove water from the exhaust stream to produce a water-rich permeate gas and a water-deficient retentate gas, with the retentate gas exiting housing 50 through outlet 44 and the permeate gas being prevented from passing through the exhaust treatment component 18.

The water-rich permeate gas collects in a reservoir portion 54 of housing 50. Water in gaseous form can then be recirculated from reservoir portion 54 back to engine 12 through a gas recirculation line 56 and/or may be directed back to exhaust passage 14 at a location downstream from exhaust treatment component 18 through a gas outlet line 58. If the water in reservoir portion 54 condenses, the liquid water 60 may collect in a recessed portion 62 of reservoir portion 54. Similar to the gaseous water in reservoir portion, the liquid water 60 can be recirculated from recessed portion 62 back to engine 12 through a liquid recirculation line 64 and/or may be directed back to exhaust passage 14 at a location downstream from exhaust treatment component 18 through a liquid outlet line 66. An optional recirculation valve 68 may be used to direct the liquid water 60 to either liquid recirculation line 64 or liquid outlet line 66.

Because liquid water 60 may collect in housing 50 and, in particular, recessed portion 62 of housing 50 during non-use of engine 12, it should be understood that water-removal device 38 may include the heating device 70 (see FIG. 2) that warms up water-removal device and thaws any liquid water that may have frozen therein. In addition, due to the possibility that water-removal membrane 52 may become fouled over extended periods of use, the heating device 70 may be configured to provide periodic electrical heating in flowing air that may be required to remove trapped soot particles, adsorbed sulfur-species, and similar moieties to thereby maintain appropriate flux performance over time. Alternatively, the heating device 70 may be omitted in favor of operating burner 25 and allowing the heated exhaust gases to enter water removal device 38.

In each of the above-noted embodiments, the gas flux through the water-removal membrane 52 may be insufficient due to low pressure drop across the membrane 52, depending on the specific application. Thus, a small compressor (not shown) may be incorporated into inlet 42 or a vacuum line (for example, through communication with the vehicle intake manifold) may be incorporated into outlet 44 to increase the flow rate of the gas flux through the membrane 52 that further improves downstream performance of the catalyst-comprising exhaust treatment component 18.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust after-treatment system for treating an exhaust produced by an engine, the exhaust after-treatment system comprising:
   an exhaust passage;
   at least one catalytic exhaust after-treatment component in communication with the exhaust passage for treating the exhaust;

a membrane vessel that receives a portion of the exhaust therein at a location positioned upstream from the catalytic exhaust after-treatment component; and a bypass passage in communication with the exhaust passage that receives the portion of the exhaust, wherein the membrane vessel is positioned within the bypass passage, and the membrane vessel includes a molecular membrane that separates at least one constituent from the portion of the exhaust to provide a permeate gas that is enriched with the constituent removed from the portion of the exhaust, and produces a retentate gas that is depleted of the constituent, which facilitates the treating of the exhaust by the catalytic exhaust after-treatment component wherein the constituent includes water.

2. The exhaust after-treatment system according to claim 1, wherein the catalytic exhaust after-treatment component includes a diesel particulate filter (DPF), a diesel oxidation catalyst (DOC) component, a selective catalytic reduction (SCR) component, a lean $NO_x$ trap (LNT), an ammonia slip catalyst (ASC), a three-way catalyst (TWC), a methane oxidation catalyst (MOC), a hydrocarbon-deNOx catalyst (HC-deNOx), or a combination thereof.

3. The exhaust after-treatment system according to claim 2, wherein the catalytic exhaust after-treatment component includes a lean NOx trap.

4. The exhaust after-treatment system according to claim 1, wherein the membrane vessel is mounted at least partially within the exhaust passage.

5. The exhaust after-treatment system according to claim 1, wherein the membrane vessel includes an inlet valve configured to allow entry of the portion of the exhaust into the membrane vessel.

6. The exhaust after-treatment system according to claim 5, further comprising a controller in communication with the valve that is configured to open and close the valve.

7. The exhaust after-treatment system according to claim 1, further comprising a mixing device configured to intermix the exhaust with an exhaust treatment fluid, the mixing device being positioned in the exhaust passage downstream from the membrane vessel and upstream of the catalyst exhaust treatment component.

8. The exhaust after-treatment system according to claim 1, further comprising an injector for dosing an exhaust treatment fluid into the exhaust passage.

9. The exhaust after-treatment system according to claim 8, wherein the exhaust treatment fluid is a hydrocarbon exhaust treatment fluid or an exhaust treatment fluid comprising urea.

10. The exhaust after-treatment system according to claim 9, wherein the hydrocarbon exhaust treatment fluid includes at least one of ethanol, an ethanol-gasoline mixture, and an ultra-low sulfur diesel fuel.

11. The exhaust after-treatment system according to claim 1, wherein the molecular membrane includes a ceramic material.

12. The exhaust after-treatment system according to claim 11, wherein the ceramic material is porous, with each pore having a diameter of 0.3 nm or less.

13. The exhaust after-treatment system according to claim 12, wherein the ceramic material comprises a zeolite.

14. The exhaust after-treatment system according to claim 13, wherein the zeolite includes a sodalite structure.

15. The exhaust after-treatment system according to claim 1, wherein the permeate gas enriched with the constituent is recycled to the engine or to the exhaust at a location downstream from the catalytic exhaust after-treatment component.

16. An exhaust after-treatment system for treating an exhaust produced by an engine, the exhaust after-treatment system comprising:

an exhaust passage;

at least one catalytic exhaust after-treatment component in communication with the exhaust passage for treating the exhaust;

a water-removal device in communication with the exhaust passage that receives a portion of the exhaust therein at a location positioned upstream from the catalytic exhaust after-treatment component, the water-removal device defined by a housing that includes a heating device and a water-removal membrane that separates water from the portion of the exhaust to provide a permeate gas that is enriched with water, and to produce a retentate gas that is water depleted, which facilitates the treating of the exhaust by the catalytic exhaust after-treatment component; and at least one recirculation line that interconnects the water-removal device and the engine that recirculates at least a portion of the permeate gas back to the engine.

17. The exhaust after-treatment system according to claim 16, wherein the catalytic exhaust after-treatment component includes a diesel particulate filter (DPF), a diesel oxidation catalyst (DOC) component, a selective catalytic reduction (SCR) component, a lean $NO_x$ trap (LNT), an ammonia slip catalyst (ASC), a three-way catalyst (TWC), a methane oxidation catalyst (MOC), a hydrocarbon-deNOx catalyst (HC-deNOx), or a combination thereof.

18. The exhaust after-treatment system according to claim 17, wherein the catalytic exhaust after-treatment component includes a lean NOx trap.

19. The exhaust after-treatment system according to claim 16, wherein the water-removal device is mounted at least partially within the exhaust passage.

20. The exhaust after-treatment system according to claim 16, further comprising a bypass passage in communication with the exhaust passage that receives the portion of the exhaust, the water-removal device being positioned within the bypass passage.

21. The exhaust after-treatment system according to claim 16, wherein the water-removal device includes an inlet valve configured to allow entry of the portion of the exhaust into the water-removal device.

22. The exhaust after-treatment system according to claim 21, further comprising a controller in communication with the valve that is configured to open and close the valve.

23. The exhaust after-treatment system according to claim 16, further comprising a mixing device configured to intermix the exhaust with an exhaust treatment fluid, the mixing device being positioned in the exhaust passage downstream from the water-removal device and upstream of the catalyst exhaust treatment component.

24. The exhaust after-treatment system according to claim 16, further comprising an injector for dosing an exhaust treatment fluid into the exhaust passage.

25. The exhaust after-treatment system according to claim 24, wherein the exhaust treatment fluid is a hydrocarbon exhaust treatment fluid or an exhaust treatment fluid comprising urea.

26. The exhaust after-treatment system according to claim 25, wherein the hydrocarbon exhaust treatment fluid includes at least one of ethanol, an ethanol-gasoline mixture, and an ultra-low sulfur diesel fuel.

27. The exhaust after-treatment system according to claim 16, wherein the water-removal membrane includes a ceramic material.

28. The exhaust after-treatment system according to claim 27, wherein the ceramic material is porous, with each pore having a diameter of 0.3 nm or less.

29. The exhaust after-treatment system according to claim 28, wherein the ceramic material comprises a zeolite.

30. The exhaust after-treatment system according to claim 29, wherein the zeolite includes a sodalite structure.

31. The exhaust after-treatment system according to claim 16, wherein the permeate gas enriched with the constituent is recycled to the engine or to the exhaust at a location downstream from the catalytic exhaust after-treatment component.

* * * * *